United States Patent [19]

Weiser et al.

[11] Patent Number: 5,084,488
[45] Date of Patent: Jan. 28, 1992

[54] MELAMINE RESIN MOLDINGS HAVING INCREASED ELASTICITY

[75] Inventors: Juergen Weiser, Schriesheim; Wolfgang Reuther, Heidelberg; Gerhard Turznik, Ludwigshafen; Wolfgang Fath, Hirschberg; Heinz Berbner, Moerlenbach; Onno Graalmann, Dossenheim, all of Fed. Rep. of Germany

[73] Assignee: BASF Aktiengesellschaft, Ludwigshafen, Fed. Rep. of Germany

[21] Appl. No.: 550,992

[22] Filed: Jul. 11, 1990

[30] Foreign Application Priority Data

Jul. 11, 1989 [DE] Fed. Rep. of Germany ....... 3922733

[51] Int. Cl.$^5$ .............................................. C08G 12/00
[52] U.S. Cl. ...................................... 521/187; 521/65
[58] Field of Search ........................................... 521/187

[56] References Cited

FOREIGN PATENT DOCUMENTS 0221330 5/1987 European Pat. Off. .
2364091 7/1974 Fed. Rep. of Germany .
2915457 10/1980 Fed. Rep. of Germany .

*Primary Examiner*—Morton Foelak
*Attorney, Agent, or Firm*—Oblon, Spivak, McClelland, Maier & Neustadt

[57] ABSTRACT

Moldings, in particular foams and fibers, based on melamine/formaldehyde condensation products, in which from 0.1 to 70 mol% of the melamine have been replaced by melamine substituted by from 1 to 3 hydroxyoxaalkyl groups of the formula $$-(CH_2-CH_2-O)_n-CH_2-CH_2-OH \quad (n=1-5)$$

have increased elasticity.

3 Claims, No Drawings

MELAMINE RESIN MOLDINGS HAVING INCREASED ELASTICITY

The present invention relates to melamine/formaldehyde condensation resin moldings, in particular foams and fibers, having increased elasticity, in which some of the melamine has been replaced by substituted melamine.

Melamine resin foams and fibers have been disclosed, for example, in DE-A-2,915,457 and DE-A-2,364,091. It is an object of the present invention to improve the elasticity of moldings of this type.

DE-A-2,915,457 describes melamine/formaldehyde condensation resin foams in which some or all of the melamine may be replaced by alkyl-substituted melamine. Replacement by hydroxyoxaalkylmelamines is not disclosed.

EP-A-221,330 describes melamine/formaldehyde condensation resin moldings, preferably foams and fibers, in which from 1 to 80% by weight of the melamine has been replaced by hydroxyalkylaminemelamine. The addition increases the strength, but reduces the elasticity.

We have found that the abovementioned object is achieved by replacing from 1 to 70 mol % of the melamine in the melamine/formaldehyde condensation resins by a melamine substituted by from 1 to 3 hydroxyoxaalkyl groups.

The present invention accordingly provides moldings, preferably foams and fibers, based on melamine/formaldehyde condensation products in which from 0.1 to 70 mol % of the melamine has been replaced by melamine substituted by from 1 to 3 hydroxyoxaalkyl groups of the formula

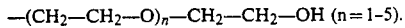
$-(CH_2-CH_2-O)_n-CH_2-CH_2-OH$ (n=1-5).

The melamine/formaldehyde condensation products which are suitable for the production of the moldings are known and described, for example, in DE-A-2,915,457. The melamine:formaldehyde molar ratio may vary within broad limits of from 1:1.5 to 1:4.5, preferably from 1:2.5 to 1:3.5.

The essential feature of the present invention is the use of hydroxyoxaalkylmelamines. These substances and their preparation are disclosed in EP-A-225,433. These compounds are melamines which carry from 1 to 3 groups of the formula

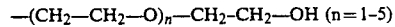
$-(CH_2-CH_2-O)_n-CH_2-CH_2-OH$ (n=1-5)

in particular the 5-hydroxy-3-oxapentyl group. N-Mono-, N,N'-bis- and N,N',N''-tris(5-hydroxy-3-oxapentyl)melamine is particularly suitable. A mixture of these three compounds is preferably employed, for example in the molar ratio 1:0.5 to 10:0.5 to 10. In contrast to hydroxyethylmelamines, hydroxyoxaalkylmelamines have an unlimited shelf life in aqueous solution. In the invention, from 0.1 to 70mol % of the melamine in the known melamine/formaldehyde condensation products are replaced by hydroxyoxaalkylmelamines.

Fibers are expediently produced using from 1 to 70, preferably 2 to 50 and in particular 5 to 25 mol % of the substituted melamine.

Foams are expediently produced using from 0.1 to 50, preferably 0.5 to 30 and in particular 1 to 15 mol % of the substituted melamine.

To prepare the resins, melamine and substituted melamine are polycondensed together with formaldehyde. However, it is also possible to start from mixtures of the individual condensation products with formaldehyde or to subsequently add further (substituted) melamine to one of the condensation products. The resins generally have a melamine component: formaldehyde molar ratio of from 1:1.5 to 1:4.5, preferably 1:2.5 to 1:3.5. They may also contain small amounts of customary additives, such as disulfate, formide, citrate, phosphate, polyphosphate, urea, dicyandiamide or cyanamide. Moldings are produced by curing the resins in a conventional manner by adding small amounts of acids, preferably formic acid.

Foams can be produced by foaming an aqueous solution or dispersion containing the melamine/formaldehyde precondensate modified according to the invention, an emulsifier, a blowing agent and a curing agent, and also, if desired, customary additives, and subsequently curing the foam. It has become apparent that particularly elastic foams are obtained if relatively highly concentrated, preferably 68 percent strength by weight or more and in particular 72 percent strength by weight or more solutions or dispersions are employed (the concentrations being based on the resin/water mixture without additives) and if foaming is carried out under conditions such that initially only a slight increase in viscosity occurs, and the curing, with a considerable increase in viscosity, only commences when the foaming is substantially complete. A process of this type is described in detail in DE-A-2,915,457. The foams obtained have increased elasticity, elongation at break and tensile strength.

In order to produce fibers, the melamine/formaldehyde resin modified according to the invention is spun in a heated atmosphere in a manner known per se after addition of a curing agent and at the same time the solvent (H₂O) is evaporated and the condensate is cured. A process of this type is described in detail in DE-A-2,364,091. The fibers obtained have increased elongation and low sliding friction.

EXAMPLE 1

Melamine resin containing 10 mol % of substituted melamine 114 g of formaldehyde (40%), 160 g of melamine, 70 g of paraformaldehyde, 58 g of 80% hydroxyoxapentylmelamine (mono:bis:tris=1:5:4), 9 g of sodium disulfite and 11 g of dicyandiamide are heated to 95° C. As soon as a clear solution forms, the pH is adjusted to 8. The mixture is kept at 95° C. until a viscosity of 350 Pas is reached. After rapid cooling, a resin having a final viscosity of 380 Pas is obtained.

Production of fibers and physical data

2% of formic acid (35%) are added to the above-described resin, which is mixed to form a homogeneous material and fed to a centrifugal spinning apparatus. Fibers having a diameter of from 5 to 15 μm are obtained. The final strength is achieved by conditioning (200° C., 10 min).

The elongation at break of the HOM fibers is 30% (cf. HEM 15%). The sliding friction test gave a coefficient of 0.65 (HEM 0.9) at a speed of 2 mm/s.

EXAMPLE 2

Melamine resin containing 3 mol % of substituted melamine 20 g of a mixture of N-mono-, N,N'-bis- and N,N',N''-trishydroxyoxapentylmelamine in the molar ratio 1:5:4 is dissolved in 80 g of water. This solution has a shelf life of significantly longer than 6 months.

50 g of this solution are mixed with stirring at room temperature with 200 g of a spray-dried, sulfite-containing melamine/formaldehyde resin (molar ratio 1:3) and 51 g of water, in which 2 g of sodium formate and 4 g of sodium citrate are dissolved, to form a homogeneous mixture.

Production of foams and physical data

A mixture of 5 g of water, 4.5 g of the sodium salt of C-15 paraffinsulfonic acid (as a 40% strength solution) and 2.7 g of the sodium salt of a sulfated C-16/C-18 alfol (as a 50% strength solution) which has been reacted with 80 mol of ethylene oxide, 7.0 g of formic acid (75%) and 50 g of pentane is incorporated into the above-described resin solution to form a homogeneous mixture.

The foamable mixture obtained in this way is foamed at 120 degrees in a microwave oven with irradiation by microwave energy and cured. Hot air at 250 degrees is subsequently passed through the crude foam for 30 minutes. The final foam has a density of 12 kg/m$^3$. 17% of the melamine has been replaced by hydroxyoxapentylmelamine.

Compared with a foam produced without the addition according to the invention, the elongation at break (DIN 53 455) is increased by 25%.

We claim:

1. A foamed molding, based on a melamine/formaldehyde condensation product, in which from 0.1 to 70 mol % of the melamine has been replaced by melamine substituted by from 1 to 3 hydroxyoxaalkyl groups of the formula $$-(CH_2-CH_2-O)_n-CH_2-CH_2-OH \ (n=1-5).$$

2. A molding as claimed in claim 1, wherein the hydroxyoxaalkyl group is the 5-hydroxy-3-oxapentyl group.

3. A molding as claimed in claim 1, wherein the substituted melamine is a mixture of N-mono-, N,N'-bis and N,N',N''-tris(5-hydroxy-3-oxapentyl)melamine.

* * * * *